Jan. 11, 1972   W. STOBER   3,634,558
METHOD OF PRODUCING MONODISPERSE SILICA SPHERES HAVING A
DISPERSED RADIOACTIVE TRACER
Filed Oct. 29, 1968

INVENTOR.
WERNER STÖBER
BY

United States Patent Office 3,634,558
Patented Jan. 11, 1972

3,634,558
METHOD OF PRODUCING MONODISPERSE SILICA SPHERES HAVING A DISPERSED RADIOACTIVE TRACER
Werner Stober, Penfield, N.Y., assignor to the United States of America as represented by the United States Atomic Energy Commission
Filed Oct. 29, 1968, Ser. No. 771,429
Int. Cl. G21c 21/00
U.S. Cl. 264—.5
2 Claims

ABSTRACT OF THE DISCLOSURE

A process for producing monodisperse silica spheres of uniform size by agitating an aqueous alcoholic solution containing ammonia and lower alkyl tetraesters of silicic acid.

BACKGROUND OF THE INVENTION

The use of colloidal suspensions of matter in the form of hydrosols and aerosols to study atmospheric and chemical process phenomena is well known in the art. A major problem encountered with prior art colloidal suspensions has been that lack of particle size uniformity of colloidal suspensions employed. Particle size variation within a system introduces a variable which can affect the results of a testing program.

A colloidal suspension having uniform particulate size would not only facilitate easy calibration procedures for analytical equipment, but would also simplify data reduction, evaluation and interpretation of experiments designed to elucidate physico-chemical properties or physio-pathological effects of colloids and aerosols. The results would no longer be biased by parameters of size and shape distributions.

Some monodisperse suspensions of particles in the colloidal size range are available in the form of spheres of organic high polymers. Generators producing monodisperse particle clouds from soluble or volatile material are used in various aerosol studies. The art has sought a process to generate monodisperse suspensions of silica particles.

A commercially available form of highly disperse silica particles are produced by combusion of silicon tetrachloride in a hydrogen torch consists of primary silica spheres of sizes below 0.1$\mu$, but they are aggregated to coarse and irregular clusters which cause a very poorly defined state of suspension. Those in the art have sought a method of producing monodisperse suspensions of silica spheres in the colloidal range, e.g., for use in calibration of electron microscopes. Such a material would enjoy widespread use in both hydrosol and aerosol studies. It would be of interest to investigators in the medical field because of its known cytotoxicity and inhalation hazard. It would be of particular interest to investigators to have monodisperse suspensions of silica spheres in the colloidal range having radioactive tracers incorporated into the bulk of the spheres by inclusion or substitution in the framework of the SiO$_4$ tetrahedrons during growth of the silica particles. This would make the silica particles a more versatile tool for many investigations since radiation would facilitate rapid measurement of field parameters by conventional radiation detection devices.

SUMMARY OF THE INVENTION

The invention described herein was made in the course of, or under a contract with the United States Atomic Energy Commission.

I have discovered a process for producing monodisperse suspensions of silica spheres having substantially uniform spheres diameters, which spheres are useful in aerosol and hydrosol investigations comprising preparing an alcoholic solution containing from about 0.01 to about 1.0 mol per liter of solution of at least one tetraester of silicic acid selected from the group consisting of tetramethyl silicic acid, tetraethyl silicic acid, tetrabutyl silicic acid, tetrapropyl silicic acid, and tetraamyl silicic acid; from about 1 to about 15 mols per liter of solution of water; from about 0.5 to about 8.0 mols per liter of ammonia; the balance of said solution being composed of at least one member of the group consisting of methyl alcohol, ethyl alcohol, propyl alcohol, butyl alcohol; thereafter agitating said solution until the spheres have condensed and formed a suspension. I have further discovered that spheres prepared by my novel process can be greatly improved by the addition of from about $10^{-8}$ to about $10^{-2}$ mols per liter of solution of a radioactive tracer to the alcoholic solution prior to the formation of spheres.

DETAILED DESCRIPTION OF THE INVENTION

Figures 1, 2, 3:
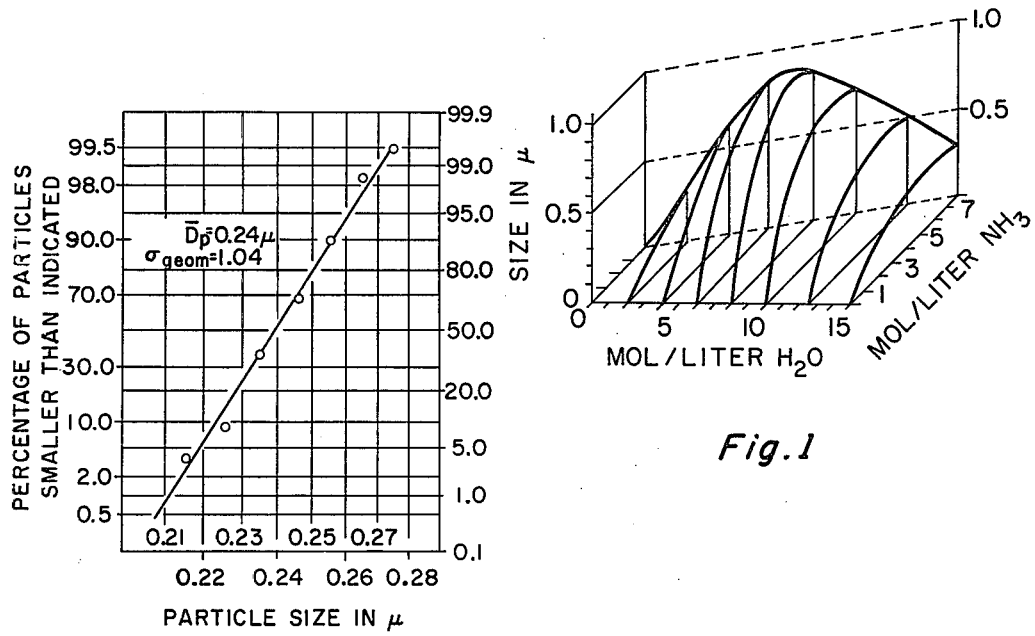
FIG. 1 is a three coordinate graph showing the correlation between particle size, water and ammonia concentrations.
FIG. 2 is an electron micrograph of spheres produced in accordance with the practice of this invention.
FIG. 3 shows a size distribution curve of the sample shown in FIG. 2.

Aqueous solutions of radioactive tracers can be employed in the preferred embodiment of my invention. Of course the amount of radioactive tracer material to be employed will be contigent both upon the degree of affinity between the tracer and the spheres as well as the desire of the user of the process.

By varying the process conditions the size and number of spheres produced by the process can be varied greatly. The following detailed examples of the practice of my invention clearly show not only the operation of the process, but also the mechanisms by which process variables can be employed to enhance the product for specific uses.

EXAMPLE I

Reagents: Methanol, ethanol, n-propanol and n-butanol, all of analytic reagent quality, as solvents.

Tetraesters of silicic acid (tetra-alkyl silicates) were either bought in technical grade (methyl, ethyl) or prepared by reacting silicon tetrachloride and alcohol (n-propyl(n-butyl, n-pentyl). All esters were redistilled before used in the experiments.

Ammonia (anhydrous, 99.99 percent) was taken from a tank, passed through a drying column filled with sodium hydroxide pellets and bubbled through the alcohol at 0° C. Concentrations obtained were about 8 molar in methanol, 5 molar in ethanol, 3 molar in n-propanol, n-butanol and n-pentanol.

Ammonium hydroxide—titrations indicated an ammonia concentration of 14.2 molar.

Procedures: Throughout the example ammonia was used as the catalyst causing the formation of spherical particles. In many cases, it was applied by adding saturated alcoholic solutions of ammonia to the reaction vessel. However, in other cases, particularly when high ammonia concentrations were desired, a saturated ammonium hydroxide solution was utilized and the water content taken into account.

At the beginning of each experiment, pure alcohol or alcohol mixtures, saturated alcoholic ammonia solution, ammonium hydroxide and water were mixed in Erlenmeyer flasks with ground stopper or in rubber sealed injection bottles to the extent that the desired concentrations of ammonia and water were established. Actual ammonia contents were measured by withdrawing small samples and titrating with 1 N hydrochloric acid. Total water contents were computed by adding up the fractional amounts introduced by the components. Subsequently, the acyl silicate was added and the flasks were mounted either on a shaker or in a water bath under ultrasonic vibrations. Some experiments were run while the solution was agitated by a magnetic stirrer. Either way of agitation was eeffctive and kept the particles in suspension after they had formed.

The total amount of solution in each experiment varied between 50 and 110 ml. One large scale experiment with 2 liters of solution gave the same result as an experiment with 80 ml. of a solution containing the same concentration of solutes.

Except for the initial exploratory experiments at low concentrations, the condensation reaction generally started within 10 minutes. This could easily be observed because, after an invisible hydrolytic reaction forming silicic acid, the condensation of the supersaturated silicic acid was indicated by an increasing opalescence of the mixture starting 1 to 5 minutes after adding the tetraalcyl silicate. After this initial phase, the transition to a turbid white emulsion occurred regularly within a few more minutes.

As a standard procedure, samples for electron microscopic investigation were taken after 120 minutes, although a series of samples taken at different times from the same test solution indicated that particles sometimes reach their final size after about 15 minutes. All sampling for size determination was done by dipping electron microscopic carrier grids covered with films into the suspension, subsequently putting them on filter paper in order to remove excessive solution from the grid and taking electron micrographs of the particles retained on the film.

Random micrographs of the samples comprsing between 100 and 1000 particles were evaluated by means of a semi-automatic particle size analyzer. The cumulative distribution curve of the particles was recorded in logarithmic size increments and plotted on log probability paper. The median projected diameter and, in some cases, the approximate logarithmic statement deviation were taken from the graph.

Results and discussion.—As for the different alcoholic solvents, reaction rates were fastest with methanol, slowest with n-butanol. Likewise, final particles sizes obtained under comparable conditions were smallest in methanol and biggest in n-butanol. However, there was a tendency toward distinct size distributions with the higher alcohols. Substituting them by methanol/butanol mixtures at a ratio of 1:1 provided more uniform big particles.

A similar relationship with regard to reaction rates and particles sizes was found when comparing results with different alcyl silicates. Fastest reactions (below 1 minute) and smallest sizes (below $0.2\mu$) were observed with tetramethyl ester, while tetrapentyl ester reacted slowly (up to 24 hours for quantitative condensation) and produced big particles which, in n-propanol and n-butanol, reached sizes somewhat scattered around $2\mu$. More uniform particles were obtained in 1:3 methanol/n-propanol mixtures.

A systematic investigation of the influence of different concentrations of water, ammonia and ester was made with the ethanol/ethyl ester system. Since the water acts as a catalyst for the silica formation, it would be expected that the condensation rate depends strongly upon the water content of the system and it is only a matter of time until the equilibrium providing a quantitative condensation of silica is established. This was found to be true. However, in the absence of ammonia, the silica flocculated in irregularly shaped silicagel particles and no spheres could be observed in the electron microscope. Thus, ammonia apparently acted as a morphological catalyst creating spherical particles whenever it was present during the reaction. An increase in ammonia concentration (up to 8 mols/liter) under otherwise constant experimental conditions resulted in increased particle sizes. Accordingly, the largest spheres were obtained when the reaction mixture was saturated with ammonia. Varying the water concentration under these conditions revealed that an optimum size was obtained at water concentrations around 6 mols/liter, while different ester concentrations between 0.02 and 0.50 mole/liter had no significant influence on the particle size. The three coordinate graph in FIG. 1 represents the general correlation between particle size, water and ammonia concentration as obtained with a medium ester concentration of 0.28 mole/liter. The actual particle sizes observed varied between 0.05 and $0.90\mu$ and were very uniform in each test. FIG. 2 shows an electron micrograph of a sample of this series and FIG. 3 indicates the cumulative size distribution curve of the same sample as plotted on log-probability paper. The geometric standard deviation derived from the graph is 1.04. This value was quite typical for most of these tests. It indicates that only 5 percent of the particles differ from the median size by more than 8 percent.

The generation of particles larger than $1\mu$ could not be effected with the ethanol/ethyl ester system but required the use of esters of higher alcohols. Various tests with these esters indicated that, under comparable conditions, the condensation reaction slowed down with increasing molecular weight of the ester, while, at the same time, particles of larger size with a fair degree of uniformity were produced. The reaction could be further slowed down by using higher alcohols as solvents. In these cases, however, the median particle size and the spread of the size distribution increased simultaneously. Sometimes the samples also contained two distinctly different particles sizes. Thus, special precautions had to be taken in order to reduce these adverse effects. To achieve this, isothermal conditions (22° C.) and homogeneous particle suspension maintained during the reaction by gentle agitation proved to be quite substantial.

An extensive investigation was made with tetrapentyl ester. In this case, particles were grown under various conditions by using different component concentrations and several alcohols or alcohol mixtures as solvents.

In the simple ethanol/pentyl ester system, at ester concentrations sufficiently low ($\leq 0.2$ mole/liter) to provide miscibility over the considered range of water concentrations ($\leq 10$ mole/liter), the results resembled the pattern given in FIG. 1. Within this range, the ester concentrations ($\geq 0.03$ mole/liter) again had little influence on the final size of the particles, but the particles obtained in these tests were definitely bigger than those grown under comparable conditions from ethyl ester. The maximum values obtained for fairly uniform batches of particles were about $1.5\mu$ in diameter.

Maximum particle sizes were obtained at an optimum water content of 5 moles/liter and at high concentrations of ammonia and ester. Under these conditions, median diameters were observed between 1.5 and $2\mu$. The best growth of fairly uniform particles of $2\mu$ in diameter was facilitated by using mixtures of methanol with butanol (1:1) and propanol (1:3) solvents.

In general, a uniform particle size is predictable from the experimental conditions within a margin of about 30 percent and the geometric standard deviation of the size distribution remains below 1.10.

EXAMPLE II

This example illustrates the practice of the preferred embodiment of my invention showing the facility with which radioactive tracers can be incorporated in my novel monodisperse silica spheres.

A standard procedure was used to grow the silica spheres. In each experiment after mixing 40 ml. of pure ethanol and 10 ml. of saturated ammonium hydroxide; 2 ml. of tetrapropyl ester of silicic acid and the radioactive tracer was added to the solution. After a few minutes the solution turned turbid and the final size of the growing particles was obtained after 2 hours. Electron micrographs indicated sizes close to 0.8μ.

The suspensions were then filtered (Millipore filter GS 0.22μ) and the activity of the filter cake and the filtrate were measured separately in a well-type crystal counter. Throughout all experiments the activity of the filtrate was essentially background level and all the activity was associated with the particles on the filter.

Experiment No. 1.—$^{134}Cs$

This isotope was added in the form of cesium chloride. The amount of 1 ml. of a solution containing less than 1 μg. of $^{134}Cs$ in 0.5 N HCl. All radioactivity could be removed from the resuspended silica particles by adding 1 g. of inactive $CsCl$ to the suspension. Two hours later, after the material was filtered, very little activity could be detected on the filter cake.

Experiment No. 2.—$^{54}Mn$

One ml. of manganese chloride in acidic solution containing 2.5 μg./ml. and an activity of 1 μc./ml. was used in these tests. The removal of the activity from the resuspended particulates could not be accomplished in alcoholic suspensions and in aqueous suspensions at pH>7. However, at low pH values, particularly after adding 1 g. of $MnCl_2$ and/or tartaric acid (20 ml. of 20% acid) a gradual removal of activity from the particles amounting to a loss of 50% within 36 hours was observed in a series of runs.

Experiment No. 3.—$^{65}Zn$

In these tests 1 ml. of a solution containing zinc in a concentration of 3 μg./ml. and an activity of 0.3 μc./ml. was added to the test solution. The resuspended particles did not release the activity in alcoholic suspension, but a gradual release was observed in aqueous suspensions. It was rather slow for high pH values but increased rapidly with decreasing pH values. At pH 2 the activity of the particles was nearly instantaneously released. Adding $Zn(NO_3)_2$ generally the rate of removal of activity from the particles at high pH values and adding 20 ml. of 0.1 molar EDTA gave the highest rates of removal of the activity at any pH value.

Experiment No. 4.—$^{124}Sb$

A tracer concentration of 4.5 μg./ml. was used in these tests and 1 ml. containing 0.25 μc. of activity was added to each test solution. Resuspending the silica particlees in various solution showed little effect on the activity associated with the particles. No changes were observed in alcoholic suspension and adding $SbCl_3$ tartaric acid to aqueous suspension did not increase a small release of activity. The highest releases were obtained at high pH values (pH 9) and amounted to about 7 percent.

Experiment No. 5.—$^{59}Fe$

One ml. of a tracer solution of 2.6 μg. Fe/ml. containing 1 μc./ml. of activity was added to the test solutions of this series. The results after resuspension of the particles indicated that the various solutions applied had little influence on the activity associated with the particles. Most prominent releases occured at high pH values and did not exceed 5 percent.

The following table gives a partial list of radioactive isotopes found useful in the practice of my invention giving conditions for attachment, desorption and method of attachment to the spheres.

TABLE

| Metal ion | Attachment | Desorption, exchange or chelation | Incorporation |
|---|---|---|---|
| $^7Be$ | 30 μg./500 g. $SiO_2$ | pH=10; tartaric acid release of 9% in 36 hours. | Yes. |
| $^{M}Cr$ | 0.5 μg./500 g. $SiO_2$ | pH=1; $KCr(SO_4)_2$ release of 6% in 36 hours. | Yes. |
| $^{155}4n$ | 2.5 mg./500 g. $SiO_2$ | pH<7; $MnCl_2$; tartr. acid release of 50% in 36 hours. | Uncertain. |
| $^{58}Mn$ | 300 mg./500 g. $SiO_2$ 70% take-up. | pH=1; $CoCl_2$ release of 75% in 24 hours. | Incomplete. |
| $^{58}Co$ | 10 μg./500 g. $SiO_2$ complete. | pH>10; release of 5% in 36 hours. | Yes. |
| $^{58}Co$ | 1 μg./500 g. $SiO_2$ complete. | pH=2; release of 6% in 36 hours. | Yes. |
| $^{59}Fe$ | 2.6 mg./500 g. $SiO_2$ complete. | pH>9; release of 5% in 36 hours. | Yes. |
| $^{65}Zn$ | 3.0 mg./500 g. $SiO_2$ complete. | pH>2; EDTA (20%) complete removal. | No. |
| $^{124}Sb$ | 4.5 mg./500 g. $SiO_2$ complete. | pH>9; release of 7% in 36 hours. | Yes. |
| $^{141}Ce$ | 150 μg./500 g. $SiO_2$ complete. | pH=1; $Ce(NO_3)_3$ release of 5% in 36 hours. | Yes. |

Discussion.—The chemical nature of the isotope used as the tracer was found to be of great influence on the mode of attachment to the growing silica particles. As a representative of elements which remain in the ionic dissociated state over the entire pH range, cesium showed in the experiments that no incorporation takes place. Apparently, the cesium ions always remain on the surface of the silica particles from where they can be removed by simple exchange with materials dissolved in the liquid phase. The same seems to be true for zinc and manganese althuogh significant removal occurred primarily at low pH values and was incomplete in the case of manganese. The results, however, strongly suggest that surface phenomena are encountered.

A different mechanism seems to occur in the case of antimony and iron. Here the results indicate that the release of tracer activity is not dependent upon the constituents of the liquid phase but that a small release is related to the solubility of silica. The saturation concentration is about 100 μg./ml. for dissolved silica at pH>8 and increases to about 400 μg./ml. at pH 10. Under the experimental conditions of the tests, this should cause and activity loss of about 8 percent at pH 10 if the activity is evenly distributed over the volume of the silica particles. The experimental results are in keeping with this assumption.

Thus it will be obvious to those skilled in the art that my novel process can be used to produce monodisperse silica particles having a wide variety of tailor made special characteristics which enhance their characteristics as research tools.

I claim:
1. A process for producing monodisperse suspensions of silica spheres having incorporated therein a radioactive tracer comprising preparing an alcoholic solution containing from about 0.01 to about 1.0 mol per liter of solution of at least one tetraester of silicic acid selected from the group consisting of tetramethyl silicic acid, tetraethyl silicic acid, tetrabutyl silicic acid, tetrapropyl silicic acid, and tetraamyl silicic acid; from about 1 to about 15 mols per liter of solution of water; from about 0.5 to about 8.0 mols per liter of ammonia; the balance of said solution being composed of at least one member of the group consisting of methyl alcohol, ethyl alcohol, propyl alcohol and butyl alcohol; adding from about $10^{-8}$ to $10^{-2}$ mols per liter of a radioactive metal tracer selected from the group consisting of $^7Be$, $^{51}Cr$, $^{58}Co$, $^{59}Fe$, and $^{124}Sb$; and thereafter agitating said solution until the spheres have condensed and formed a suspension.

2. The process of claim 1 wherein said radioactive tracer is $Co^{58}$.

References Cited

UNITED STATES PATENTS 3,340,202   9/1967   Olombel et al. _____ 252—301.1
3,364,148   1/1968   Kivel et al. _____ 252—301.1

BENJAMIN R. PADGETT, Primary Examiner

S. J. LECHERT, JR., Assistant Examiner

U.S. Cl. X.R.

252—301.1